April 22, 1969     H. J. TYLER     3,439,710

VALVE CONSTRUCTION

Filed Nov. 2, 1965

INVENTOR

HUGH J. TYLER

BY Arnold & Raflance

ATTORNEYS

United States Patent Office 3,439,710
Patented Apr. 22, 1969

3,439,710
VALVE CONSTRUCTION
Hugh J. Tyler, Fairport, N.Y., assignor to Robertshaw Controls Company, Richmond, Va., a corporation of Delaware
Filed Nov. 2, 1965, Ser. No. 506,057
Int. Cl. F16k 31/44, 19/00, 13/00
U.S. Cl. 137—612          10 Claims

ABSTRACT OF THE DISCLOSURE

A three-way valve in which the valve element takes the form of a continuous band of elastic material mounted on an actuator. The band is supported only at its sides by the actuator thereby leaving a central portion of each side of the band unobstructed by the actuator and freely stretchable. The valve element is used in a three-way valve in which the valve element is movable to a first position in which one valve port is closed, a second position in which another valve port is closed, and a third or neutral position between the first and second positions in which both valve ports are closed.

---

This invention relates generally to a valve construction, and particularly to a flexible valve element for use in a valve assembly of unique construction.

More specifically, the invention relates to a unique resilient valve element which cooperates with a valve seat in a unique manner to close a flow passage.

Although the valve of this invention has other uses, it has particular utility for controlling the flow of gas in gas-fired heaters and ovens of the domestic type.

The valve element is a sheet of flexible material which is also resilient. The valve element is arranged to engage a valve seat so that only a portion of the resilient sheet of the valve element completely unobstructed by the valve actuator engages the valve seat.

The valve arrangement of this invention also finds particular utility in a valve of the three-way type wherein it is desired to move the valve element from a first position in which a first discharge port is closed and a second port open, to a second position in which the first port is open and the second closed, by moving the valve element through a neutral position in which both ports of the valve are closed. By maintaining both ports closed at the neutral position, undesirable throttling at either of the valve seats of the ports is eliminated. When used in the environment of a three-way valve, the valve element is mounted for snapover center pivotal movement to assure rapid transfer of the valve element in response to the action of an operator operated in response to an external condition, such as temperature.

In its preferred embodiment, the valve element takes the form of a flexible band of elastic material which is mounted on spaced apart legs of an actuator. By virtue of its mounting, the central or valve seat engaging portion of the valve element is completely unsupported so that closing of the valve seat is a result of the resiliency or stretch of the material of the valve element.

In the preferred embodiment to be subsequently described, the thin resilient sheets of the valve element are utilized to close the discharge ports of a valve casing having positive internal pressure. When so used with positive internal pressure, the unsupported surface of the valve element sheet is subjected to a positive pressure which biases the sheet against the outlet port and sealing of the sheet against the outlet port is thus assisted by the positive pressure within the casing of the valve.

By virtue of its simplicity of construction, the valve element provides a very reliable valve for controlling the flow of low pressure fluids, especially where throttling must be avoided during transfer of the valve element from one outlet port to another.

The numerous advantages and unique features of the valve construction of this invention will become apparent with reference to the drawings, in which.

Figure 1:
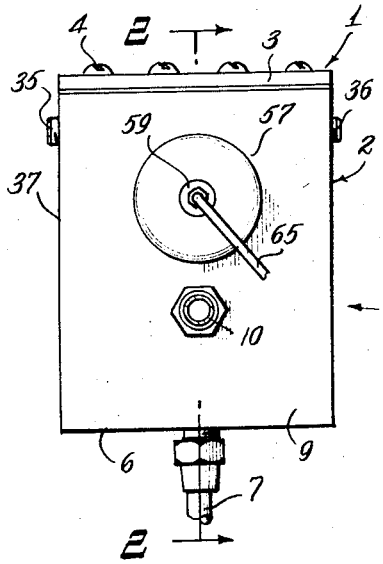
FIG. 1 is a front elevational view of the valve assembly of this invention.
Figure 2:
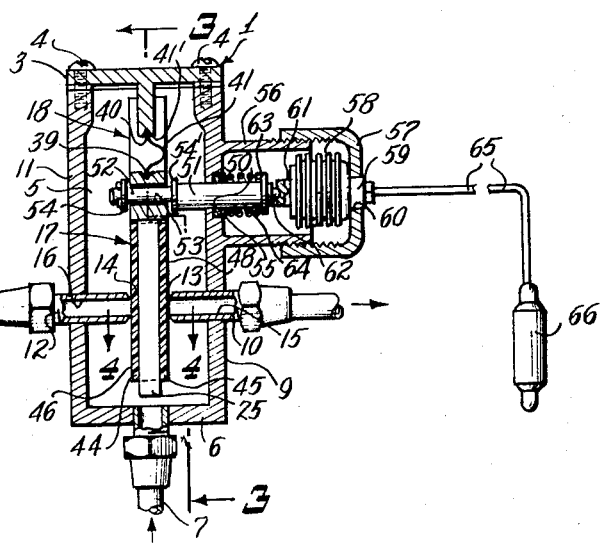
FIG. 2 is a sectional view looking along lines 2—2 of FIG. 1.
Figure 3:
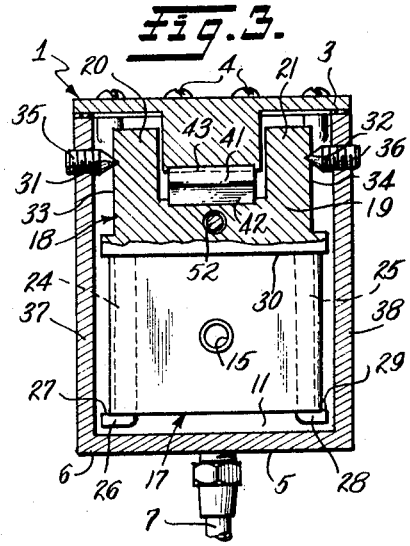
FIG. 3 is a view in section looking along lines 3—3 of FIG. 2.

Referring now to the drawings in detail and particularly to FIGS. 1-3, there is shown a valve assembly 1 having a casing 2 of generally boxlike configuration and a flat cover 3 secured to the upper end of the casing by screws 4 to provide a valve chamber 5. Communicating with chamber 5 via a bottom wall 6 is an inlet conduit 7 which is connected to a source of pressure fluid (not shown).

Extending through a front wall 9 of casing 2 is a short length of pipe 10 and extending through back wall 11 is a short length of pipe 12, the pipes being threaded into appropriate openings in the walls 9 and 11. Pipe 10 is the same diameter as pipe 12 and has its axis aligned with the axis of pipe 12. Valve seats 13 and 14 are formed respectively on the inner ends of pipes 10 and 12 by tapering the ends of the pipes as shown in FIG. 2. The inner end edge of pipe 12 where valve seat 13 is formed is parallel with the inner end edge of pipe 12 where valve seat 14 is formed. The openings of pipes 10 and 12, respectively, provide discharge ports 15 and 16 which communicate with apparatus (not shown) to which the flow of fluid from inlet conduit 7 is controlled.

In chamber 5 of casing 2 of the valve assembly is is a movable valve element 17. Valve element 17 is mounted on a valve actuator 18 which is mounted for pivotal movement about an axis at the upper end of casing 2 adjacent cover 3. Actuator 18 is formed from a plate of rigid lightweight material such as aluminum. The actuator includes a body portion 19 having spaced apart legs 20 and 21 projecting toward cover 3, and which define a U-shaped recess 22 with a straight bottom edge 23 parallel with cover 3, therebetween. Projecting toward bottom wall 6 from the opposite sides of body portion 19 and integral therewith are narrow parallel spaced apart arms 24 and 25 which are of the same length and project substantially beyond discharge ports 15 and 16. The free end of arm 24 has an ear 26 which projects outwardly in a direction away from arm 25 to provide a stop surface 27 which faces toward body portion 19 of the actuator. Similarly, the free end of arm 25 has an ear 28 which projects outwardly in a direction away from arm 24 to provide a stop surface 29 which faces toward body portion 19 of the actuator. Stop surfaces 27 and 29 are coplanar. Each of arms 24 and 25 have a thickness as viewed in FIG. 2 which is slightly less than the thickness of body portion 19 and the arms are set inwardly slightly of the outer edges of the body portion as shown in FIG. 3 to provide a continuous stop shoulder 30 parallel with and facing toward stop surfaces 27 and 29.

The pivotal mounting for actuator 18 includes a pair of aligned conical recesses 31 and 32 in the side edges 33 and 34 of legs 20 and 21, respectively. These conical recesses 31 and 32 provide bearings to receive conically pointed setscrews 35 and 36, respectively, which are threadedly received in and extend through the sidewalls 37 and 38, respectively, of casing 2, in axially aligned relation and parallel with cover 3.

The flat edge 23 between legs 20 and 21 is provided with a V-shaped recess 39 which extends substantially the distance between the legs. In vertical alignment with V-shaped recess 39 (with the actuator in the neutral position of FIG. 2) is a second V-shaped recess 40 formed in the end edge 41' of a tab which projects from the center of cover 3. Recesses 39 and 40 are parallel with each other and face toward each other to receive the ends of a bowed leaf type compression spring 41 which provides for over center snap movement of actuator 18. Observe from FIGS. 2 and 3 that the ends 42 and 43 of compression spring 41 are parallel with each other and are substatnially coplanar in the same vertical plane as the V-shaped recesses 39 and 40 with the actuator in its neutral position as shown at FIG. 2, and that recess 40 is below the pivotal axis of the actuator to assure over center snap operation.

Movable valve element 17 is in the form of a band of taut flexible sheet material which is preferably resilient, for example, rubber, and which is disposed on arms 24 and 25 with the side edges of the sheet closely adjacent stop surfaces 27 and 29 at the lower end of the arms and stop shoulder 30 at the upper end of the legs. Such mounting prevents slipping of valve element 17 during operation of the valve. To mount valve element 17 on actuator 18, it is necessary to stretch the band of resilient material and slip same over legs 24 and 25 to the position of FIGS. 2 and 3. In its relaxed condition, the band of valve element 17 is shorter than the distance between the outer edges of legs 24 and 25 so that the band is under tension by virtue of its resiliency when mounted on the legs.

When mounted on actuator 18, the band of valve element 17 provides a first thin resilient sheet 44 parallel with and spaced from a second thin resilient sheet 45. Sheet 44 has an outer face 46 and an inner face 47 and, similarly, second sheet 45 has an outer face 48 and an inner face 49 (see FIG. 4).

Extending through an opening 50 of front wall 9 and slidably received therein is an operating rod 51 with a reduced diameter end 52 which extends through an opening 53 in the body portion 19 of actuator 18. Fixed to the reduced diameter end 52 in spaced apart relation are a pair of washers 54 and 54'. The distance between the inner faces of washers 54 is slightly greater than the thickness of body portion 19 to provide for free snap over center operation of actuator 18. Observe that the diameter of end 52 is slightly less than the diameter of opening 53 to allow the actuator to tilt relative to rod 51 so that the actuator can move pivotally without the adjacent cylindrical surface of end 52 engaging the inner surface of opening 53.

Packing 55 is provided around rod 51 adjacent opening 50 where the rod extends through the front wall of casing 2. Packing 55 prevents leaking of fluid from chamber 5 of the casing around rod 51. Concentric with rod 51 is a sleeve 56 formed integral with front wall 9 and projecting outwardly at right angles thereto. A cap 57 with internal threads is arranged to be threaded on the exteriorly threaded sleeve 56. Mounted in the chamber formed by sleeve 56 and cap 57 is a bellows 58 having an end 59 which extends through opening 60 in the end wall of cap 57. There is a slight clearance between end 59 and opening 60 to permit cap 57 to be rotated without rotating bellows 58. However, the fit between end 59 and opening 60 is sufficiently close that the bellows is normally maintained with its axis generally perpendicular to the plane of front wall 9, as shown at FIG. 2. The inner end 61 of bellows 58 is provided with a depression to receive the reduced diameter tip 62 of rod 51. Adjacent tip 62 a snap ring 64 is fixed to rod 51 to provide a seat for compression spring 63 which encircles the portion of rod 51 which extends outwardly beyond front wall 9. The other end of compression spring 64 seats on packing 55 to maintain the packing energized.

Bellows 58 contains a suitable thermally responsive fluid and connects, through a capillary tube 65, with a temperature sensing bulb 66 positioned at a location where a temperature is to be sensed, for example, in proximity to the pilot flame of a gas-fired heater or oven which is controlled by the valve.

Figures 4, 5, 6:
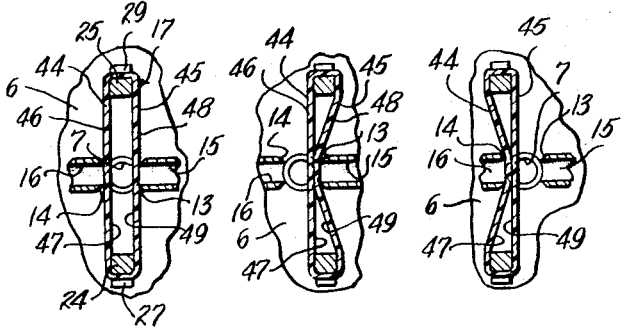
FIG. 4 is a view looking along lines 4—4 of FIG. 2 and showing the valve element in a neutral or central position in which both outlet passages of the valve assembly are closed.
FIG. 5 is a view corresponding to FIG. 4 but with the valve element actuated to a position at one side of its neutral position to open one of the outlet passages of the valve.
FIG. 6 is a view corresponding to FIG. 5 but showing the valve element actuated to a position on the other side of its neutral or central position so that the other outlet passage of the valve is open.

FIGS. 2 and 4 show movable valve element 17 in a neutral position. In this neutral position, as best seen at FIG. 4, it will be observed that the distance between the parallel outer surfaces 46 and 48 of sheets 44 and 45, respectively, is essentially the same as the distance between valve seats 13 and 14. It is also to be observed that the resilient material of each of sheets 44 and 45 at the area of engagement with valve seats 13 and 14 is completely unobstructed by legs 24 and 25 of actuator 18 so that closing of discharge ports 15 and 16 of the valve is in part due to the flexibilty or resiliency of sheets 44 and 45. In the valve arrangement of FIGS. 4–6, the unobstructed area of each of sheets 44 and 45 is several times as great as the outside diameter of either of valve seats 13 and 14.

In the preferred embodiment, it is to be recalled that inlet conduit 7 is in constant communication with chamber 5 of casing 2. Thus, a positive pressure is provided within the casing whenever both valve seats 13 and 14 are closed by the flexible valve element 17. This positive pressure creates a force on the inner surfaces 47 and 49 of sheets 44 and 45, respectively, which is greater than the force exerted by this same pressure on outer faces 46 and 48 of the sheets by an amount equal to the product of the pressure and the area of the discharge port. Due to this pressure unbalance, sheet 44 is urged against valve seat 14 and sheet 45 is urged against valve seat 13 whenever valve element 17 and the actuator 18 on which it is mounted are in the neutral position of FIGS. 2 and 4.

Figure 7:
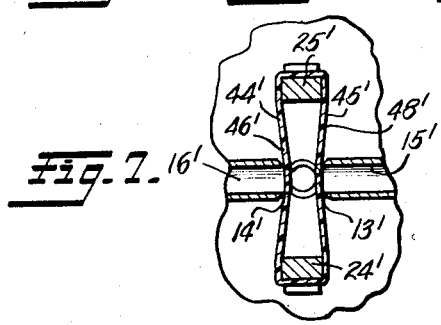
FIG. 7 shows the dimensional arrangement between the valve seats and valve element for a second embodiment of the valve element of this invention.

FIG. 7 shows a second embodiment of the valve of this invention in which the dimensional relationships between valve seats 13 and 14 and the movable valve element identified as valve element 17' are slightly different. In this embodiment, it will be noted that the distance between outer faces 46' and 48' of sheets 44' and 45', respectively, is slightly greater than the distance between valve seats 13' and 14'. Such an arrangement creates a small outwardly directed component of force due to the flexibility and elasticity of movable valve element 17, to press the surfaces 46' and 48' of the movable valve element against both seats when the valve is in its neutral position. This arrangement insures good sealing of both the outlet passages simultaneously when the valve element is in its neutral position.

*Operation*

Although FIGS. 2 and 4 show actuator 18 and movable valve element 17 in a neutral position in which both discharge ports 15 and 16 are closed, it is to be appreciated that this neutral position is a position through which the valve element passes in moving from the extreme position of FIG. 5 in which only valve seat 13 is sealed and the extreme position of FIG. 6 in which only valve seat 14 is sealed.

Assume for purposes of explanation that the temperature at bulb 66 decreases to collapse bellows 58, whereupon a pull to the right (FIG. 2) is exerted on actuator 54 because of the action of compression spring 64. As soon as valve element 17 and actuator 18 are tilted slightly in a direction toward valve seat 13, a component of force from over center snap spring 41 is realized which causes actuator 18 to snap to the position of FIG. 5. In this position, surface 48 of a sheet 45 firmly engages valve seat 13 and is drawn across the valve seat as shown. Observe that the arrangement is such that substantially all the force exerted on actuator 18 is exerted by the over center spring 41 and that this spring is so selected that the added resiliency of sheet 44 when engaged by the center portion of sheet 45, as shown in FIG. 5, substantially resists further pivoting of the actuator. It is, however, to be observed that sheet 46 adds a slight additional sealing force to the force already applied by sheet 45.

Now assume that bulb 66 is exposed to a flame which causes the fluid in the closed system comprised of bellows 58, capillary tube 65 and bulb 66 to expand. Such expansion of the fluid expands the bellows which causes end 61 of the bellows to move to the left, thereby driving rod 51 in the same direction against the action of compression spring 64. When washer 54' engages body portion 19 of the actuator, the actuator is gradually moved to its neutral position of FIG. 2 wherein the actuator is centrally located between valve seats 13 and 14 to close discharge ports 15 and 16. Observe that at this position, the force exerted by leaf spring 41 passes through the pivotal axis of the actuator and, hence, the actuator is in a balanced or neutral condition. As bellows 58 continues to expand, the force exerted by washer 54' against the body portion 19 causes the actuator to move slightly to the left. As such movement takes place, the line of action of over center spring 41 passes to the left of the pivotal axis of the actuator so that the spring exerts a force tending to pivot the actuator further to the left from the position of FIG. 2. As valve seat 13 begins to open, the pressure unbalance on sheet 45 is no longer present as soon as the sheet unseats from valve seat 13. This reduces the force required to pivot actuator 18 to the left and thus allows spring 41 to snap the actuator to the left so that resilient sheet 44 of valve seat 17 is stretched across valve seat 14 to close discharge port 16.

The operation for the valve element of FIG. 7 is substantially the same as that described with regard to FIGS. 4–6. However, it will be observed that both discharge ports 15' and 16' remain closed during a longer portion of the pivotal swing of the actuator. However, as soon as the previously closed outlet passage is opened, the operation of both embodiments is the same.

Although two preferred embodiments have been shown and described, it is to be understood that numerous variations can be made in the construction of the valve of this invention without departing from the intended scope thereof. For example, although the operator for the valve is shown and described as a thermally responsive bellows to move the valve from a first position in which one discharge port is closed, to a neutral position in which both discharge ports are closed and then to a third position in which the previously closed discharge port is open, it is to be appreciated that other types of valve operators such as manual operators in the form of an operating knob could be used to accomplish this function.

In addition, the resilient valve element 17 could be supported in other ways, for example, at the entire periphery of the band so that only a central portion of each sheet of the band is unobstructed without departure from the scope of the invention.

In view of the foregoing, it is seen that applicant has provided a valve construction with a unique flexible valve seat which seals in a unique manner to provide a three-way valve in which there is no undesirable throttling at one valve seat as the valve transfers from one discharge port to the other.

I claim:
1. A valve assembly comprising
  a first valve seat having a first discharge port therein;
  a second valve seat, spaced from said first valve seat along a predetermined path and having a second discharge port therein;
  an actuator;
  valve means movable with said actuator and comprising
    a first sheet of elastic material having its sides connected to said actuator and having a portion between its sides unobstructed by the actuator, and
    a second sheet of elastic material spaced from said first sheet and having its sides connected to said actuator and a portion between its sides unobstructed by the actuator;
  means mounting said actuator for movement along a predetermined path
    to a first position, in which said unobstructed portion of said first sheet is elastically deformed against said first valve seat to close said first discharge port, and in which said second discharge port is open,
    to a second position, in which said unobstructed portion of said second sheet is elastically deformed against said second valve seat to close said second discharge port, and in which said first discharge port is open, and
    to a third position between said first and second positions and in which said unobstructed portion of said first sheet engages said first valve seat to close said first discharge port, and said unobstructed portion of said second sheet engages said second valve seat to close said second discharge port.

2. A valve assembly in accordance with claim 1 in which
  said valve means are within a chamber of a valve assembly having an inlet conduit to produce a positive pressure within the chamber; and
  said unobstructed portions of said sheets are urged respectively into sealing engagement with said valve seats by said positive pressure when said actuator is in said third position.

3. A valve in accordance with claim 1 in which
  said valve means is an endless band of resilient material;
  said actuator includes first and second spaced apart parallel arms which extend through the inside of said band and by which said band is mounted on said actuator,
  the distance around said arms being greater than the relaxed inside length of said band.

4. A valve in accordance with claim 3 in which
  said first and second arms have stop means at the ends thereof to prevent said band from moving off said arms in a direction parallel with said arms.

5. A valve assembly in accordance with claim 1 in which
  said actuator is mounted for pivotal movement; and which further includes a temperature responsive operator to operate said actuator.

6. A valve assembly comprising
  a first valve seat having a first flow port therein;
  a second valve seat spaced from said first valve seat along a predetermined path and having a second flow port therein;
  an actuator having an opening therein of greater cross-sectional dimension than said valve seats;

valve element means mounted on said actuator and comprising
- a closed band of elastic material extending around said actuator, first and second opposed portions of said band extending across said opening and providing first and second valve elements with the portions thereof extending across said opening unobstructed by said actuator,
- said first valve element facing toward and being engageable with said first valve seat, and
- said second valve element facing toward and being engageable with said second valve seat,
- the distance between said valve elements being at least as great as the distance between said valve seats, as measured along said predetermined path; and means mounting said actuator for movement along a predetermined path
- to a first position, in which said unobstructed portion of said first valve element is elastically deformed against said first valve seat and closes said first flow port, and in which said second flow port is open,
- to a second position, in which said unobstructed portion of said second valve element is elastically deformed against said second valve seat and closes said second flow port, and in which said first flow port is open, and
- to a third position, between said first and second positions, in which said unobstructed portion of said first valve element is in engagement with said first valve seat and closes said first flow port and said unobstructed portion of said second valve element is simultaneously in engagement with said second valve seat and closes said second flow port.

7. A valve assembly according to claim 6 wherein said actuator includes a pair of parallel arms; said opening is U-shaped and is defined in part by said arms; and
said band extends around said arms.

8. A valve assembly according to claim 6 wherein said opposed portions of said band which provide said first and second valve elements are generally parallel with each other.

9. A valve assembly according to claim 6 wherein said distance between said valve elements is greater than the distance between said valve seats;
whereby, said valve elements, in said third position, are elastically deformed into engagement respectively with said valve seats.

10. A valve assembly according to claim 6 wherein said valve seats and valve element means are within a chamber of the valve assembly; and
said valve assembly further includes
an inlet conduit via which a positive pressure is maintained within said chamber; and
said unobstructed portions of said first and second valve elements are urged respectively into sealing engagement with said first and second valve seats by said positive pressure, when said actuator is in said third position.

References Cited

UNITED STATES PATENTS

| | | | |
|---|---|---|---|
| 1,072,998 | 9/1913 | Shaw | 137—625.44 |
| 1,606,355 | 11/1926 | Fisher | 251—75 |
| 2,636,518 | 4/1953 | Strebel | 251—303 |
| 3,108,613 | 10/1963 | Bochan | 137—625.44 |
| 3,215,162 | 11/1965 | Carver | 137—625.44 |

FOREIGN PATENTS 1,335,050  7/1963  France.

M. CARY NELSON, *Primary Examiner.*

WILLIAM R. CLINE, *Assistant Examiner.*